(12) United States Patent
Li

(10) Patent No.: US 7,139,433 B2
(45) Date of Patent: Nov. 21, 2006

(54) COMPOUND IMAGE COMPRESSION METHOD AND APPARATUS

(75) Inventor: Xin Li, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 688 days.

(21) Appl. No.: 10/388,995

(22) Filed: Mar. 13, 2003

(65) Prior Publication Data

US 2004/0179742 A1   Sep. 16, 2004

(51) Int. Cl.
G06K 9/36   (2006.01)
(52) U.S. Cl. ................. 382/232; 382/173; 382/240
(58) Field of Classification Search ............... 382/232, 382/239, 244, 248, 173, 166, 176, 240, 224, 382/237, 137, 156, 274; 375/240.12, 240.19; 358/448, 461, 462, 474, 505
See application file for complete search history.

(56) References Cited

U.S. PATENT DOCUMENTS

| 5,778,092 A | 7/1998 | MacLeod et al. ............ 382/176 |
| 6,275,620 B1 | 8/2001 | de Queiroz ................. 382/270 |
| 6,701,012 B1 * | 3/2004 | Matthews ................... 382/173 |
| 6,853,755 B1 * | 2/2005 | Li ............................. 382/239 |

OTHER PUBLICATIONS

Marpe et al., "A Two-Layered Wavelet-Based Algorithm for Efficient Lossless and Lossy Image Compression", IEEE vol. 10, No. 7, Oct. 2000, pp. 1094-1102.*
L. Bottou et al., "High quality document image compression using DjVu", Journal of Electronic Imaging, vol. 7, pp. 410-425, Jul. 1998.
R.L.de Queiroz et al., "Optimizing block-thresholding segmentation for multiplayer compressing of compound images", IEEE Trans. on Image Processing, vol. 9, pp. 1461-1471, Sep. 2000.
A. Said and A. Drukarev, "Simplified segmentation for compound image compression", Proceeding of ICIP'1999.
D. Taubman and A. Zakhor, "Multirate 3D subband coding of video", IEEE Trans. on Image Processing, vol. 3, No. 5, pp. 572-588, Sep. 1994.
D. Taubman, "High performance scalable image compression with EBCOT", IEEE Trans. on Image Processing, vol. 9, No. 7, pp. 1158-1170, Jul. 2000.
Mixed Raster Content ITU-T Study Group 8, Question 5, Draft Recommendation T.44, May 1997, Specification about the Mixed Raster Content(MRC) model.

(Continued)

*Primary Examiner*—Anh Hong Do
(74) *Attorney, Agent, or Firm*—Jon M. Dickinson PC; Robert D. Varitz PC

(57) ABSTRACT

A method and apparatus for compressing compound images of the type containing text, graphics and photographic imagery. This method and apparatus offer significant simplicity and computational efficiency by progressing fundamentally through a first processing phase, wherein an original compound image is first separated into (1) a foreground (text and graphics) layer, and (2) a more pixel-complicated background (photographic imagery) layer, all based upon a simple region-growing segmentation algorithm, and then a follow-up phase which involves individual and differentiated compression of the two segmented layers. Simple regional boundary encoding is employed for the foreground layer, and a lifting-scheme-modified ASWT algorithm is employed for the background layer.

6 Claims, 1 Drawing Sheet

OTHER PUBLICATIONS

M.J. Weinberger, "The LOCO-I lossless image compression algorithm: principles and standardization into JPEG-LS", IEEE Trans. on Image Processing, vol. 9, No. 8, pp. 1309-1324, Aug. 2000.

W. Sweldens, "The lifting scheme: a new philosophy in biorthogonal wavelet constructions ",Wavelet Applications in Signal and Image Processing III, pp. 68-79, Proc. SPIE 2569, 1995.

JBIG, "Progressive bi-level image compression", International Standard, ISO/IEC 11544, 1993.

Leon Bottou and Steven Pigeon, "Lossy Compression of Partially Masked Still Images," in *Proceedings of IEEE Data Compression Conference*, (Snowbird, UT), Apr. 1998.

J. Li and S. Lei, "Arbitrary shape wavelet transform with phase alignment", 1998 IEEE International Conference on Image Processing, vol. 3, pp. 683-687, Chicago, IL, Oct. 1998.

Shipeng Li; Weiping Li , "Shape-adaptive discrete wavelet transforms for arbitrarily shaped visual object coding", IEEE Transactions on Circuits and Systems for Video Technology, vol. 10 Issue: 5 , pp. 725-743, Aug. 2000.

P. Ausbeck, "The piecewise-constant image model", Proc. of IEEE, vol. 88, No. 11, Nov. 2000.

X. Wu and N. Memon, "Context-based adaptive lossless image coding", IEEE Trans. on Communication, vol. 45, pp. 437-444, Apr. 1997.

Ingrid Daubechies and Wim Sweldens, "Factoring Wavelet Transforms into Lifting Steps", J. Fourier Anal. Appl., vol. 4, Nr. 3, pp. 247-269, 1998.

\* cited by examiner

COMPOUND IMAGE COMPRESSION METHOD AND APPARATUS

BACKGROUND AND SUMMARY OF THE INVENTION

This invention pertains to computer apparatus and methodology for compressing compound original images of the type containing different visual component mixes of text, graphics, and photographic images, and the like. In particular, it relates to such apparatus and methodology which addresses the field of Mixed-Raster-Content (MRC)-based compression of compound images.

A preferred embodiment of, and manner of practicing, the invention feature: (a) the employment of a low-complexity, region-growing, segmentation algorithm to create a mask that defines, for subsequent compression, a differentiation, between foreground and background constituents (layers) of an original compound image; (b) the use of an embedded, topological, histogram-based boundary-encoding algorithm for compressing the defined foreground layer; and (c) an arbitrary-shape-wavelet-transform (ASWT)-based coding algorithm for compressing the defined background layer.

In offering improvement in the current state of the art regarding compound image compression, the present invention addresses the problem quite satisfactorily of optimizing the compression performance of MRC-based image encoding. As is well understood by those skilled in the art, due to the redundancy factors that are introduced by traditional MRC coding, wherein each pixel in an image has a corresponding value in multiple (such as three) layers, the matter of how to avoid information leakage becomes a major challenge. Previous approaches typically take what is known as a data-filling approach to solve issues raised by foreground and background image encoding, i.e., dealing with those masked pixels which are referred to as don't-care pixels, which masked pixels are replaced by certain values that maximize the smoothness of the overall image intensity field. The well understood data-filling solution in this situation enjoys simplicity because it transforms the problem of coding an arbitrarily shaped object into the issue of encoding a rectangular shape which has been well studied before. However, it is usually the case that any data-filling approach will not maximally eliminate the problem of redundancy, because theoretically no data bit should be used to code masked regions.

There also exist certain, more sophisticated, projection-based approaches for compressing partially masked images. In addition, the use of what is known as an arbitrary-shape-wavelet-transform (ASWT) has also been proposed in the past to address this problem.

By way of contrast, instead of following the prior art route of employing a data-filling-type approach, such as is traditionally thought of in conventional practice, the present invention addresses the issue of compressing partially masked images in a more explicit way, and in particular, in a way which exploits the arbitrary shape property of a masked image during the compression process. To deal with the foreground layer, the invention proposes a pallet-based, embedded, topological coding scheme. For the background layer, the invention extends the idea of employing a lifting scheme in cooperation with ASWT coding in order to improve and enhance that otherwise conventional prior art technique. It thus employs, for the background layer, what is referred to herein as a modified ASWT encoding, or compressing, procedure. The approach proposed by the present invention, as one will see on reading the detailed description below, does not suffer from any appreciable information leakage.

As will now be discussed in greater detail, in general terms, the method and apparatus of the present invention approach the issue of compressing a compound image of the type generally outlined above by applying a certain innovative collection of steps, which, as a collection, are unique in the art, and which, individually, include internal uniqueness per se. The first step performed, following appropriate review of the original compound image, is a segmentation step, wherein an original compound image, typically including some combination of text, and/or graphics, and/or photographic imagery, is divided into what is referred to herein as a foreground image layer (text and graphics), and a background image layer (photographic imagery), so as to create a mask relationship between these two segmented layers. The specific segmentation approach for mask creation involves analyzing an original image to locate regions, or neighborhoods, that contain relatively large and noticeable contiguous expanses of like-characteristic (such as like-color) pixels (for example, regions with a pixel population of about 8-pixels or more). Such regions are typically ones that have been created by a computer with a relatively limited pallet of colors, and these regions can be thought of as containing "pallet-based" images that have very distinctive and easily discernable boundaries between different colors.

The next steps involved in the practice of the invention relate to the application of compression algorithms per se, with a specifically different, layer-focused algorithm employed for each of the two segmented layers—foreground and background.

For compressing the foreground image, a technique is employed which is referred to as an embedded, topological, histogram-based boundary-encoding approach, wherein the specific boundaries that reside between adjacent regions of different pallet-based colors are encoded. All of the text and graphics regions which are appropriate for regional segmentation in accordance with the mask-creating step are so treated, and are considered to be part, therefore, of the foreground image layer. The background image layer is compressed utilizing an arbitrary-shape-wavelet-transform (ASWT)-based encoding algorithm which is applied in a somewhat modified and unique form, in the sense that a lifting scheme is imported into and utilized by this algorithm.

The resulting overall compression, therefore, of a compound image of the type now being discussed, is performed in a very computationally non-intensive manner, and indeed, in a relatively simple and very effective manner.

The various features and other advantages and new contributions to the relevant art that are made by the present invention will become readily apparent from a reading of the following detailed description of the invention taken along with a study of the accompanying drawings. Included in the detailed narrative which follows the description of the several drawings immediately below, is a section entitled "References". This section lists a number of prior art technical references that provide helpful background relative to the features and the operation of the present invention. These references are identified with bracketed numbers, some of which also appear in the narrative text, where appropriate.

DETAILED DESCRIPTION OF THE INVENTION

Figure 2:
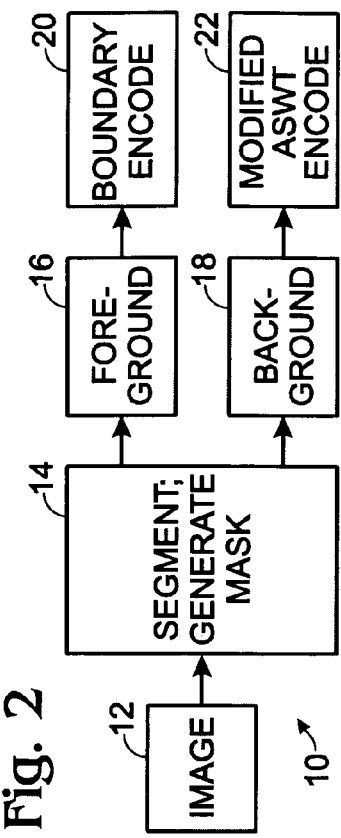
FIG. 2 is a slightly more detailed block/schematic diagram of the structure and methodology of the invention.
Figure 1:
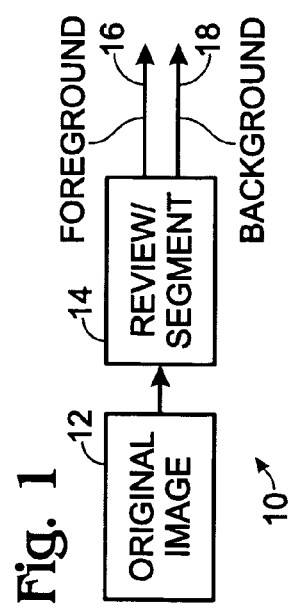
FIG. 1 is a high-level, simplified, block/schematic flow diagram which functions to illustrate, simultaneously and broadly, both the computer-based structure and the methodology of the present invention.

Turning now to the drawings, and referring first of all to FIGS. 1 and 2, indicated generally at 10 in these two figures are two different levels of block diagrams which generally illustrate the structure and methodology of the present invention. According to this invention, and describing it herein throughout for the most part in methodologic terms, an original image 12 is reviewed, utilizing computer technology, by a block 14 which reviews this image to segment it into what are referred to herein as foreground and background images 16, 18 respectively. This reviewing or analyzing of the image for the purpose of segmentation is done to create a masking condition that fully defines the contents of the separated foreground and background constituent images. In general terms, and according to the present invention, the foreground image is one which includes a very small color pallet, and typically incorporates in it computer-generated graphics and text which tend to be defined by a relatively small number of colors (color pallet).

Employing a very simple approach aimed at identifying the typical relatively large neighborhood regions that are characterized by a small color pallet, it is possible to identify very quickly and easily the text and graphics portions of a compound or composite image which have a limited color pallet, and which can be identified quickly as being the constituents to treat as foreground image information.

Figure 3C:
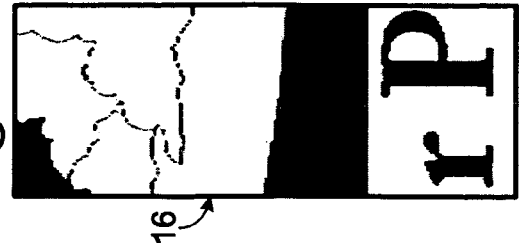
FIG. 3C is an enlarged portion drawn fragmentarily from a part of FIG. 3B, and helps to illustrate the practice implemented herein in the algorithm which encodes the boundaries between pallet-based, differentiated color regions that are identified during the mask-generation phase and practice of the invention.
Figure 3B:
FIG. 3B illustrates a mask which has resulted from the layer-segmentation procedures implemented by the present invention.
Figure 3A:
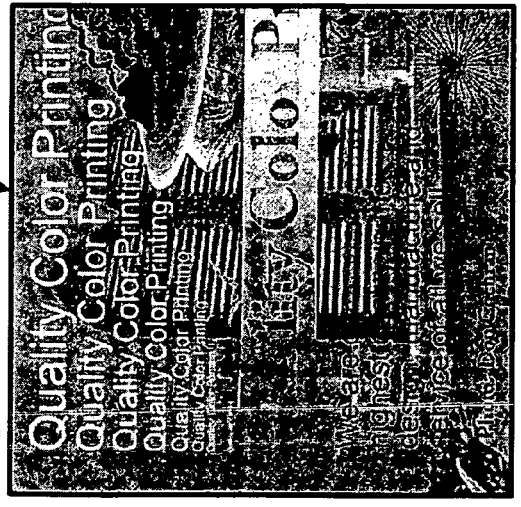
FIG. 3A is a pictorial representation of a typical compound image including text, graphics and photographic imagery.

FIGS. 3A and 3B in the drawings picture the application of this segmentation and review process quite clearly. FIG. 3A is the original compound image 15 which includes text, computer graphics, and photographic imagery, which imagery is more complex significantly in color pallet than are the text and graphics components of the compound image. FIG. 3B represents separation or mask identification of what will be treated according to the invention as a foreground image 16 which is made up of the small-color-pallet, generally larger regions of text and graphics that characterize the original compound image of FIG. 3A. The black and white spaces which appear in FIG. 3B identify the separation which has taken place, and the enlarged view of a fragment of FIG. 3B which is shown in FIG. 3C gives a larger-scale detail drawn from what appears as a separated foreground image mask in FIG. 3B. The number 16 also points to this foreground image in FIGS. 1 and 2.

All other constituent elements of the original compound image than those which are thus identified through a very simply preliminary algorithmic approach to separate small-color-pallet constituent elements of an image are declared to be the background image component 18, as such is shown very generally and schematically in FIGS. 1 and 2.

One very simple kind of conventional algorithm which can be employed to perform the segmentation and separation which has just been described, takes the form of a quite simple region-growing algorithm for identifying uniform color regions that are distributed throughout an original image.

Once review segmentation and separation for masking purposes has been accomplished, two separate compression algorithms, one of which will be employed to compress the foreground image data components of the original image, and the other of which will be employed to compress the background constituent elements of the original image, are then applied separately to the segmented foreground and background image constituent elements. All of the work performed by practice of the invention to this point is done completely without utilizing the sometimes problematic conventional data-filling approach which is employed in the prior art techniques to prepare an image for encoding and processing.

The two different compression algorithms which are now applied separately and individually to foreground and background constituent image elements are represented by blocks 20, 22, respectively, in FIG. 2. Considering first of all foreground image (or layer) compression, since the separated foreground layer will typically only contain (small-color-pallete) text and graphic components, it is possible to base an appropriate compression technique upon three characteristics that generally always distinguish foreground image componentry, as such as identified and treated by the present invention. One of these characteristics is that text and graphics images tend to contain far fewer colors than the number of actual pixels employed in the text and graphics areas of a compound image. Secondly, large areas which are contiguous with respect to pixel adjacency are typically formed with pixels of the same color. Finally, the color of each pixel is normally statically related to surrounding pixel colors. The boundary encoding algorithm which is now applied to segmented foreground imagery constituent elements can be discussed in the following manner.

One first assumes that the total number of colors in an image, i.e., the so-called pallet size, is N. One can then take an arbitrary ordering of the various N colors that have been identified, and label them from 1 to N. For a given pallet, it is not necessary to distinguish a pallet image and its index map because these two things carry identical information. Using $R_n$ to denote the set or region associated with color n, one defines what is referred as the union set $U_n$ by the following equation:

$$U_n = \bigcup_{k=n+1}^{N} R_k \quad \forall n \in \{0, 1, \ldots, N-1\}$$

One can note here that the definition of the union set starts from $U_0$ (the original image) and ends with $U_{N-1} = R_N$.

Viewing FIGS. 3A and 3B together, one can see that these two drawing figures graphically explain this union's definition, and it is easy to verify that the defined union's use of n satisfies the following recursive property:

$$U_n = R_n \cup U_{n+1}, \forall n \in \{0,1,\ldots,N-2\}$$

With the notation thus introduced above, one can decompose the original pallet image into an N−1-pass region-based model. The first pass resolves the uncertainty between $R_1$ and $U_1$, and the second pass resolves the uncertainty between $R_2$ and $U_2$, and so on. Generally the nth pass corresponds to the partition of the set $R_n$ from the union set $U_{n-1}$. Given that, we can make the following two observations:

We can see that the palette image coding problem is transformed into the coding of N−1 boundaries (binary maps) generates by N−1 passes. In fact, the coding of N−1 binary maps can be classified into two scenarios: the first pass during which the support of the union set $U_0$ is rectangular and other passes during which the support of the union set $U_n$ is typically arbitrary. The coding of $R_1$ from $U_0$ is relatively straightforward. Standard context modeling techniques in JBIG [9], CALIC [14] that classify the current symbol based on its causal neighbors (contexts) can be easily applied to exploit the spatial dependency within the image. By contrast, the coding of $R_n$ (n>1) is more challenging due to the arbitrary shape of $U_{n-1}$ and the masked regions $R_1, R_2, \ldots, R_{n-1}$. Fortunately, the shape of $U_{n-1}$ (or equivalently)

$$\overline{U}_{n-1} = \bigcup_{k=1}^{n-1} R_k,$$

is already known to the decoder after the first n−1 passes. Therefore, we only need to skip those pixels masked by $\overline{U}_{n-1}$ and modify the definition of contexts accordingly. In our context definition, each causal neighbor can take three values: 0 if it is masked; 1 if it belongs to $R_n$ and 2 if it belongs to $U_n$. When the order of contexts is 4, it amounts to $3^4=81$ different classes (i.e. 81 probability models updated in the arithmetic coder).

1) During the n-th pass, sets $R_1, R_2, \ldots, R_{n-1}$ have been completely determined; therefore the coding of the set $R_n$ should be independent of $R_1, R_2, \ldots, R_{-1}$ but conditioned on the union set $U_n$ only.
2) Due to the recursive partition, we only need a binary map to distinguish $R_n$ from $U_{n-1}$ during the n-th pass.

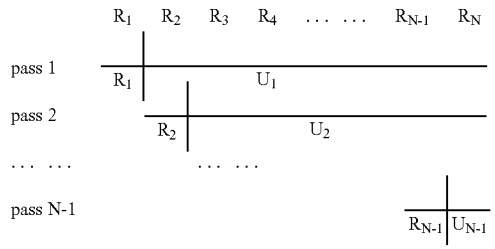

Definition of Union Set $U_n$ and Recursive Partition

A detailed description of such compression can be found in co-pending U.S. patent application Ser. No. 10/269,645, filed Oct. 11, 2002, for "Palette-Based Image Compression Method, System and Data File", the entirety of which is hereby incorporated herein by reference (Specification and Drawings in Attachment A hereto).

Background layer compression, in accordance with another special feature introduced by the present invention, and in collaboration with an arbitrary-shape-wavelet-transform, usually referred to as an ASWT transform, utilizes a lifting scheme approach which, as a stand-alone approach per se, is generally known to those skilled in the art. This collaboration is a new uniting of compression techniques proposed by the invention.

Expressing now the algorithmic approach employed to compress the background image constituent elements employing ASWT modified by the use of a lifting scheme, and expressing this algorithm in the context of certain prior art literature, which is indentified below by bracketed numbers, this algorithmic approach can be expressed in the following manner.

Lifting scheme [8] provides a novel insight into the wavelet transform from prediction point of view. It has been shown most wavelet transforms can be factored into lifting steps [15]. For example, the popular 9-7 filter can be implemented by two Prediction-and-Updating (P-and-U) stages and two scaling stages [15]:

Stage 1 (scaling): $s_l^{(0)}=x_{2l}, d_l^{(0)}=x_{2l+1}$ (3)

Stage 2 (P-and-U): $d_l^{(1)}=d_l^{(0)}+\alpha(s_l^{(0)}+s_{l+1}^{(0)}), s_l^{(1)}=s_l^{(0)}+\beta(d_l^{(1)}+d_{l-1}^{(1)})$ (4)

Stage 3 (P-and-U): $d_l^{(2)}=d_l^{(1)}+\gamma(s_l^{(1)}+s_{l+1}^{(1)}), s_l^{(2)}=s_l^{(1)}+\delta(d_l^{(2)}+d_{l-1}^{(2)})$ (5)

Stage 4 (scaling): $s_l=\zeta s_l^{(2)}, d_l=d_l^{(2)}/\zeta$ (6)

where $\alpha=-1.5861$, $\beta=-0.0530$, $\gamma=0.8829$, $\delta=0.4435$, $\zeta=1.1496$. One of the salient features with lifting scheme is that the reversibility is always guaranteed. As a matter of fact, the inverse transform can be easily obtained by exactly reversing the above four stages. Such property facilitates the implementation of arbitrary shape wavelet transform (ASWT) using the lifting scheme.

Suppose the mask associated with the data sequence is $m_l$. We can modify the transform for an unmasked pixel by a few simple rules. For example, let us consider equation (4). In the prediction stage, if both $s_l$ and $s_{l+1}$ are unmasked, no change is needed; if only $s_l$ is unmasked, we let $s_{l+1}=s_l$; if only $s_{l+1}$ is unmasked, we let $s_l=s_{l+1}$; if both $s_l$ and $s_{l+1}$ are masked, we treat them as 0. Similar modification can be made with the updating part and equation (5). Our modification rules can be viewed as symmetric extension of the pixel value at the boundary of masked regions. Due to the structure of the lifting scheme, our modification does not affect the reversibility. Therefore, the inverse transform can still be readily found by reversing the forward transform.

The mask value of a wavelet coefficient inherits from the mask value of the corresponding pixel. It is clearly seen that our ASWT generates exactly the same number of coefficients as the original unmasked pixels. We can still apply the existing embedded coding techniques of wavelet coefficients such as Layer-Zero-Coding (LZC) [4] but simply skip those masked wavelet coefficients. Slight modification with the context definition is required. We can force the masked causal neighbors to all have a zero value in the context definition. Adaptive binary arithmetic coding [9] is employed to map all symbols to the binary bit stream.

Thus, there is now described a novel method (and related structure) which can be implemented for compressing a compound original image of the type which includes plural components selected from the group including text, graphics and/or photographic imagery, and the like. In general terms this method includes the steps of (1) analyzing the image to locate regions formed from at least a predetermined number of contiguous, like-appearing pixels, (2) characterizing all such regions collectively as being either one of (a) a foreground image layer, and (b) a background image layer, and thereby creating a layered segmentation of the original image, and (3) then applying appropriate compression to the two segmented layers. This practice is done, as was mentioned, without resort to any data-filling process. Further, compression is performed to the two segmented layers by a different, layer-characteristic-specific, compression algorithm, as expressed above.

The location of regions that have contiguous like pixels which become characterized as foreground image regions is based upon application to the original image of a region-growing segmentation algorithm of the type described above. The manner of compression utilizing boundary characteristics for the foreground image constituent elements of an original image preferably takes place via an embedded, topological, histogram-based, boundary-encoding algorithm, which simply performs encodation by the practice of identifying and coding for the boundaries between adjacent pixel colors in the foreground imagery.

Compression of the background imagery constituent elements, or layer, is accomplished via a lifting-scheme-modified, arbitrary-shape, wavelet-transform-based coding algorithm.

Thus, an original image is processed in accordance with the present invention through the unique approach of segmenting it as described into foreground and background imagery components, and then applying separate appropriate algorithms to compress the separated components in the most appropriate mainer. It will be apparent to those generally skilled in the art that by taking the approach just described herein in accordance with the invention to compress compound images of the type described, the approach proposed by the invention creates decompressed images which are of high visual quality with reduced bit rate characteristics.

The structural view of the invention can be taken by recognizing that the block diagrams presented in FIGS. 1 and 2 of the drawings represent a unique structural arrangement of elements that perform the specific steps of the present invention, namely, initial review and segmentation, as described, into foreground and background layers, and then application of different compression algorithms to the separated layers.

REFERENCES

[1] L. Bottou et al., "High quality document image compression using DjVu", Journal of Electronic Imaging, Vol. 7, pp. 410–425, July 1998.

[2] R. L. de Queiroz et al., "Optimizing block-thresholding segmentation for multiplayer compressing of compound images", IEEE Trans. on Image Processing, Vol. 9, pp. 1461–1471, September 2000.

[3] A. Said and A. Drukarev, "Simplified segmentation for compound image compression", Proceeding of ICIP'1999.

[4] D. Taubman and A. Zakhor, "Multirate 3D subband coding of video", IEEE Trans. on Image Processing, Vol. 3, No. 5, pp. 572–588, September 1994.

[5] D. Taubman, "High performance scalable image compression with EBCOT", IEEE Trans. on Image Processing, Vol. 9, No. 7, pp. 1158–1170, July 2000.

[6] Mixed Raster Content ITU-T Study Group 8, Question 5, Draft Recommendation T.44, May 1997. Specification about the Mixed Raster Content(MRC) model.

[7] M. J. Weinberger, "The LOCO-I lossless image compression algorithm: principles and standardization into JPEG-LS", IEEE Trans. on Image Processing, Vol. 9, No. 8, pp. 1309–1324, August 2000

[8] W. Sweldens, "The lifting scheme: a new philosophy in biorthogonal wavelet constructions", Wavelet Applications in Signal and Image Processing III, pp. 68–79, Proc. SPIE 2569, 1995

[9] JBIG, "Progressive bi-level image compression", International Standard, ISO/IEC 11544, 1993

[10] Leon Bottou and Steven Pigeon, "Lossy Compression of Partially Masked Still Images," in Proceedings of IEEE Data Compression Conference, (Snowbird, Utah), April 1998.

[11] J. Li and S. Lei, "Arbitrary shape wavelet transform with phase alignment", 1998 IEEE International Conference on Image Processing, volume 3, pp. 683–687, Chicago, Ill., October 1998.

[12] Shipeng Li; Weiping Li , "Shape-adaptive discrete wavelet transforms for arbitrarily shaped visual object coding", IEEE Transactions on Circuits and Systems for Video Technology, Volume: 10 Issue: 5, Page(s): 725–743, August 2000

[13] P. Ausbeck, "The piecewise-constant image model", Proc. of IEEE, vol. 88, no. 11, November 2000

[14] X. Wu and N. Memon, "Context-based adaptive lossless image coding", IEEE Trans. on Communication, Vol. 45, pp. 437–444, April 1997.

[15] Ingrid Daubechies and Wim Sweldens, "Factoring Wavelet Transforms into Lifting Steps", J. Fourier Anal. Appl., Vol. 4, Nr. 3, pp. 247–269, 1998.

While a preferred manner of practicing the invention, and a preferred structural arrangement which implements the steps of this method, have been described and illustrated herein, it is appreciated that variations and modifications may be made without departing from the spirit of the invention.

I claim:

1. A method for compressing a compound original image which includes plural components selected from the group including text, graphics and/or photographic imagery and the like comprising analyzing the image to locate regions formed from at least a predetermined number of contiguous, like-appearing pixels, characterizing all such regions collectively as one of (a) a foreground image layer, and (b) a background image layer, characterizing remaining regions in the image as the other one of such two layers, said two characterizing steps creating a layered segmentation of the original image, and applying appropriate compression to these two segmented layers, with the compression which is applied to the layer associated with the pixel-likeness regions utilizing a topological, histogram-based, encoding algorithm, and the compression which is applied to the other layer utilizing an arbitrary-shape-wavelet transform (ASWT)-based coding algorithm in a form which employs a lifting scheme.

2. The method of claim 1, wherein all steps are performed without any resort to employing a data-filling process.

3. The method of claim 1, wherein the step of analyzing to locate regions formed from contiguous like pixels is based upon application to the original image of a pixel-neighborhood, region-growing, segmentation algorithm.

4. A method for compressing a compound original image which includes plural components selected from the group including text, graphics, and/or photographic imagery and the like comprising segmenting the image into differently characterized layers, including a text/graphics layer, and a photographic imagery layer and the like, and performing compression by applying differentially specific compression algorithms to each such segmented layer, with the compression which is applied to the text/graphics layer utilizing a topological, histogram-based, boundary-encoding algorithm, and the compression which is applied to the photographic imagery layer utilizing an arbitrary-shape-wavelet-transform (ASWT)-based coding algorithm applied in a form which employs a lifting scheme.

5. The method of claim 4, wherein the text-graphics layer is treated as a foreground layer, and the photographic imagery layer is treated as a background layer.

6. The method of claim 4, wherein segmenting of the image includes analyzing the image to locate regions that are formed from at least a predetermined number of contiguous, like-appearing pixels.

* * * * *